US007473037B2

(12) United States Patent
Robertson et al.

(10) Patent No.: US 7,473,037 B2
(45) **Date of Patent: *Jan. 6, 2009**

(54) OPTICAL FIBRE CONNECTOR SYSTEM

(75) Inventors: Bruce Elphinston Robertson, Glen Waverley (AU); Ross Stuart Williams, Frankston (AU)

(73) Assignee: Kingfisher International, Pty Ltd (AU)

(*) Notice: Subject to any disclaimer, the term of this patent is extended or adjusted under 35 U.S.C. 154(b) by 0 days.

This patent is subject to a terminal disclaimer.

(21) Appl. No.: 11/653,203

(22) Filed: Jan. 12, 2007

(65) Prior Publication Data

US 2007/0223863 A1 Sep. 27, 2007

Related U.S. Application Data

(63) Continuation of application No. 10/391,404, filed on Mar. 17, 2003, now Pat. No. 7,163,342.

(30) Foreign Application Priority Data

Mar. 18, 2002 (AU) .................................... PS1207

(51) Int. Cl.
*G02B 6/38* (2006.01)

(52) U.S. Cl. .......................................... 385/60; 385/53

(58) Field of Classification Search .................. 385/53, 385/55, 56, 58, 59, 60, 65, 66, 70, 72, 77, 385/78, 83

See application file for complete search history.

(56) References Cited

U.S. PATENT DOCUMENTS 4,611,887 A 9/1986 Glover et al.
4,762,389 A 8/1988 Kaihara
4,902,094 A 2/1990 Shank
5,052,944 A 10/1991 Mitani et al.
5,061,827 A 10/1991 Grabbe
5,092,784 A 3/1992 de Mendez et al.
5,098,314 A 3/1992 Castagna et al.
5,101,463 A 3/1992 Cubukciyan et al.
5,123,864 A 6/1992 Karlovich
5,129,023 A 7/1992 Anderson et al.
5,159,652 A 10/1992 Grassin D'Alphonse et al.
5,181,861 A 1/1993 Gaver, Jr. et al.
5,233,674 A 8/1993 Vladic
5,333,221 A 7/1994 Briggs et al.
5,420,951 A 5/1995 Marazzi et al.
5,467,062 A 11/1995 Burroughs (Continued)

FOREIGN PATENT DOCUMENTS

EP 0 156 397 A2 3/1985

(Continued)

*Primary Examiner*—Thanh-Tam T Le
(74) *Attorney, Agent, or Firm*—Wells St. John P.S.

(57) ABSTRACT

An optical fibre connector system, including an optical connector disposed therein, and a recess allowing a through connector to be connected to the optical connector. The optical fiber connector system includes an engagement mechanism that acts on the optical connector to prevent release of the through connector when connected to the optical connector, and which is operable to enable release of the through connector. The engagement mechanism is a movable element that normally engages the connector to the support and which can be moved to disengage the connector from the support, thereby releasing the through connector.

21 Claims, 10 Drawing Sheets

12
20
18
22
14
10
16

U.S. PATENT DOCUMENTS 5,481,634 A 1/1996 Anderson et al.
5,532,659 A 7/1996 Dodart
5,537,501 A 7/1996 Iwano et al.
5,603,636 A 2/1997 Kanou et al.
5,661,832 A 8/1997 Yonemura
5,692,080 A 11/1997 Lu
5,695,357 A 12/1997 Wright
5,748,818 A * 5/1998 Weiss et al. .................. 385/59
5,815,618 A * 9/1998 Takahashi et al. ............ 385/60
5,887,095 A 3/1999 Nagase et al.
5,887,100 A 3/1999 Robertson
5,896,477 A * 4/1999 Stephenson et al. ........... 385/53
6,083,034 A 7/2000 Kameyama
6,097,873 A 8/2000 Filas et al.
6,102,581 A 8/2000 Deveau et al.
6,126,453 A 10/2000 Gomez et al.
6,149,315 A 11/2000 Stephenson
6,220,763 B1 4/2001 Stephenson
6,422,759 B1 7/2002 Kevern
6,478,472 B1 11/2002 Anderson et al.
6,568,861 B2 5/2003 Benner et al.
6,575,639 B2 6/2003 Shibutani
6,623,170 B2 9/2003 Petrillo
6,652,156 B2 * 11/2003 Shinagawa et al. ............ 385/78
6,916,119 B2 * 7/2005 Okochi et al. ................. 385/78

FOREIGN PATENT DOCUMENTS

EP 0351803 A2 1/1990
EP 0 462 907 A1 6/1991
EP 0514114 A1 5/1992
EP 0514114 A1 11/1992
EP 0 616 236 A1 11/1993
EP 1209498 A2 5/1999
EP 0969299 A2 1/2000
EP 1065756 A2 1/2001
EP 1065756 A2 3/2001
GB 2 261 742 A 5/1993
GB 2313207 A 11/1997

* cited by examiner

OPTICAL FIBRE CONNECTOR SYSTEM

CROSS REFERENCE TO RELATED APPLICATION

This patent application is a continuation application of U.S. patent application Ser. No. 10/391,404, filed Mar. 17, 2003, now U.S. Pat. No. 7,163,342, issued Jan. 16, 2007, entitled "An Optical Fibre Connector System", naming Bruce E. Robertson and Ross Stuart Williams as inventors, which relates to and claims priority to corresponding Australian Patent Application No. PS1207/02, which was filed on Mar. 18, 2002.

TECHNICAL FIELD

The present invention relates to an optical fibre connector system.

BACKGROUND OF THE INVENTION

The fibre optic communications industry currently uses a wide variety of different optical fibre connector types. The connectors are used to interconnect and disconnect optical fibres used for light transmission. To provide a satisfactory connection requires optical connectors to be high precision mechanical devices, with tolerances on certain parts being on the order of 1 micron. The connectors are difficult to manufacture and many years of engineering effort have been required to perfect and develop the various types of connectors, most of which are manufactured in large quantities. The different types of connectors are essentially all incompatible and, as the industry evolves, new types are being developed with improved characteristics. Despite the wide variety of connector types available, there has been a general lack of user-installable and inexpensive components for adapting between connector types. A number of adaptors for connecting different types of connectors are available but tend to be severely limited in application, due to either excessive cost or limited performance. Some adaptors are used with optical instrumentation, but are usually incorporated into the instrumentation, so that the instrument can only be used to connect to one type of connector. A user purchasing the instrument therefore can only make use of it with one type of optical connector.

It is desired to provide an optical connector system that alleviates one or more difficulties of the prior art, or at least a useful alternative to existing connector systems.

SUMMARY OF THE INVENTION

In accordance with the present invention, there is provided an optical fibre connector system, including an optical connector disposed therein, a recess allowing a through connector to be connected to said optical connector, and an engagement mechanism which acts on said optical connector to prevent release of said through connector when connected to said optical connector, and which is operable to enable release of said through connector.

Preferably, said connector system includes a support which includes said recess and holds at least part of said optical connector which includes a terminating part of an optical fibre.

Preferably, said engagement mechanism includes a movable element which normally engages said connector to said support and which is moved to disengage said connector from said support to enable said release of said through connector.

Preferably, said movable element is normally biased.

Preferably, said element is a resilient arm which is attached to part of said connector.

Preferably, said connector system includes a support and a connector assembly having means for reversibly engaging said support.

Preferably, said optical connector includes at least two components that are engaged to prevent said release of said through connector, said release being enabled by disengaging at least one of said components.

Preferably, said components are relatively movable to enable said release, and said release is enabled by disengaging one of said components.

Preferably, said components are engaged with said support to prevent said release, and said release is enabled by disengaging one of said components.

Preferably, said connector assembly includes an inner sleeve assembly for supporting an optical fibre and for reversibly engaging said support to enable said release of said through connector, and an outer sleeve for supporting said inner sleeve and for reversibly engaging said support.

Preferably, said optical connector includes an SC, LC, or MU connector.

BRIEF DESCRIPTION OF THE INVENTION

Preferred embodiments of the present invention are hereinafter described, by way of example only, with reference to the accompanying drawings wherein.

DETAILED DESCRIPTION OF THE PREFERRED EMBODIMENTS

Optical fibres connectors are made according to a number of different designs which, although incompatible, have similar characteristics. Standard connector types include, for example, ST. SC, LC, MU, FC, D4, LSA, E2000, EC and SMA, which are made by a number of manufacturers. The connectors are used to make an optical connection between two optical fibres, and are positioned at the ends of an optical fibre, with the fibre tip being polished to provide a desired interconnecting surface. To make a connection between two fibres, two optical connectors are required, together with a through connector which is used to align the optical connectors so that the fibres are properly aligned and light is transmitted from one fibre to the other. A through connector includes an alignment sleeve which is a precision component used to align the optical fibres of the two optical connectors. A spring mechanism may be provided within a connector to provide controlled pressure on the end face of the fibre when a connection is made to improve control optical parameters such as forward loss and return loss.

Figure 1:
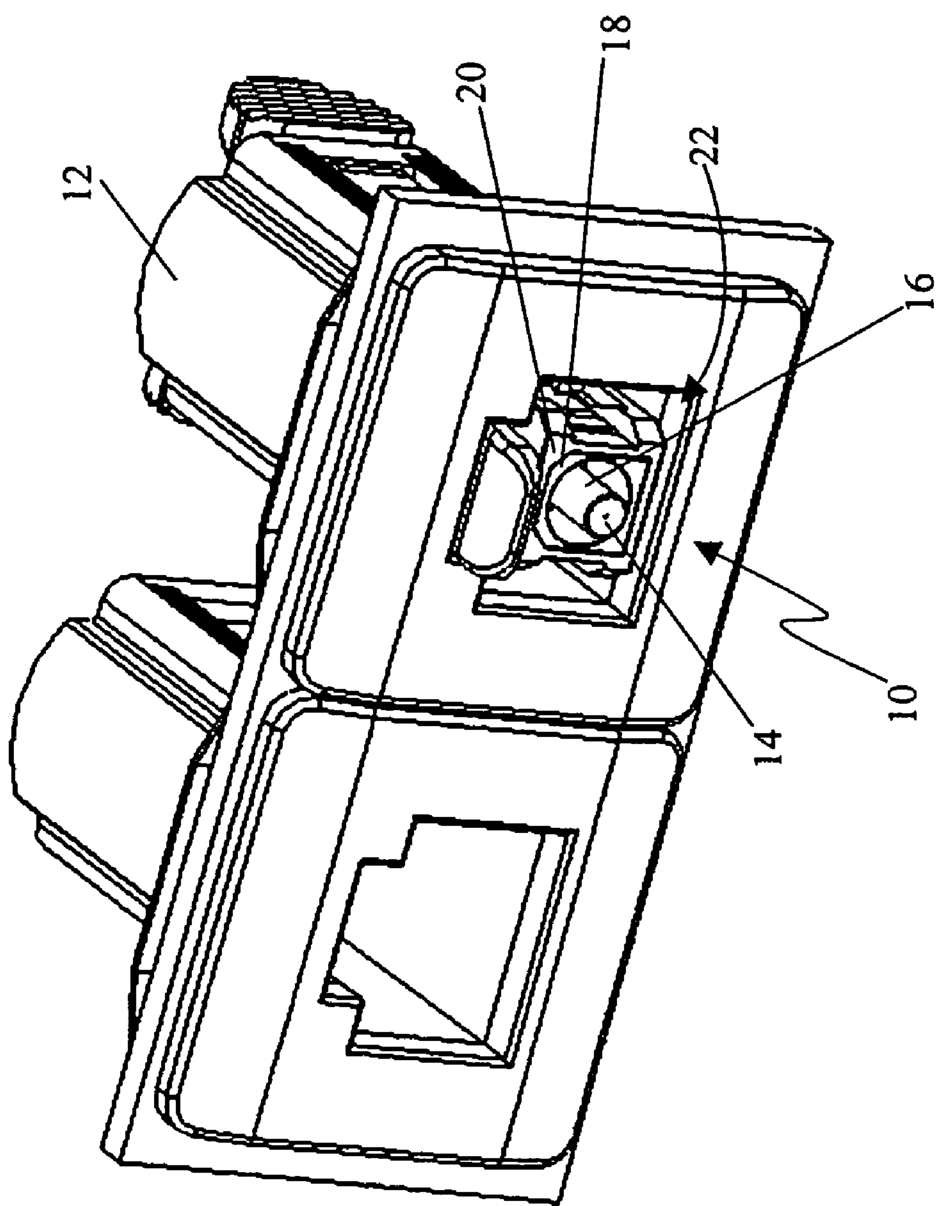
FIG. 1 is an isometric view of a preferred embodiment of an optical fibre connector system.
Figure 3:
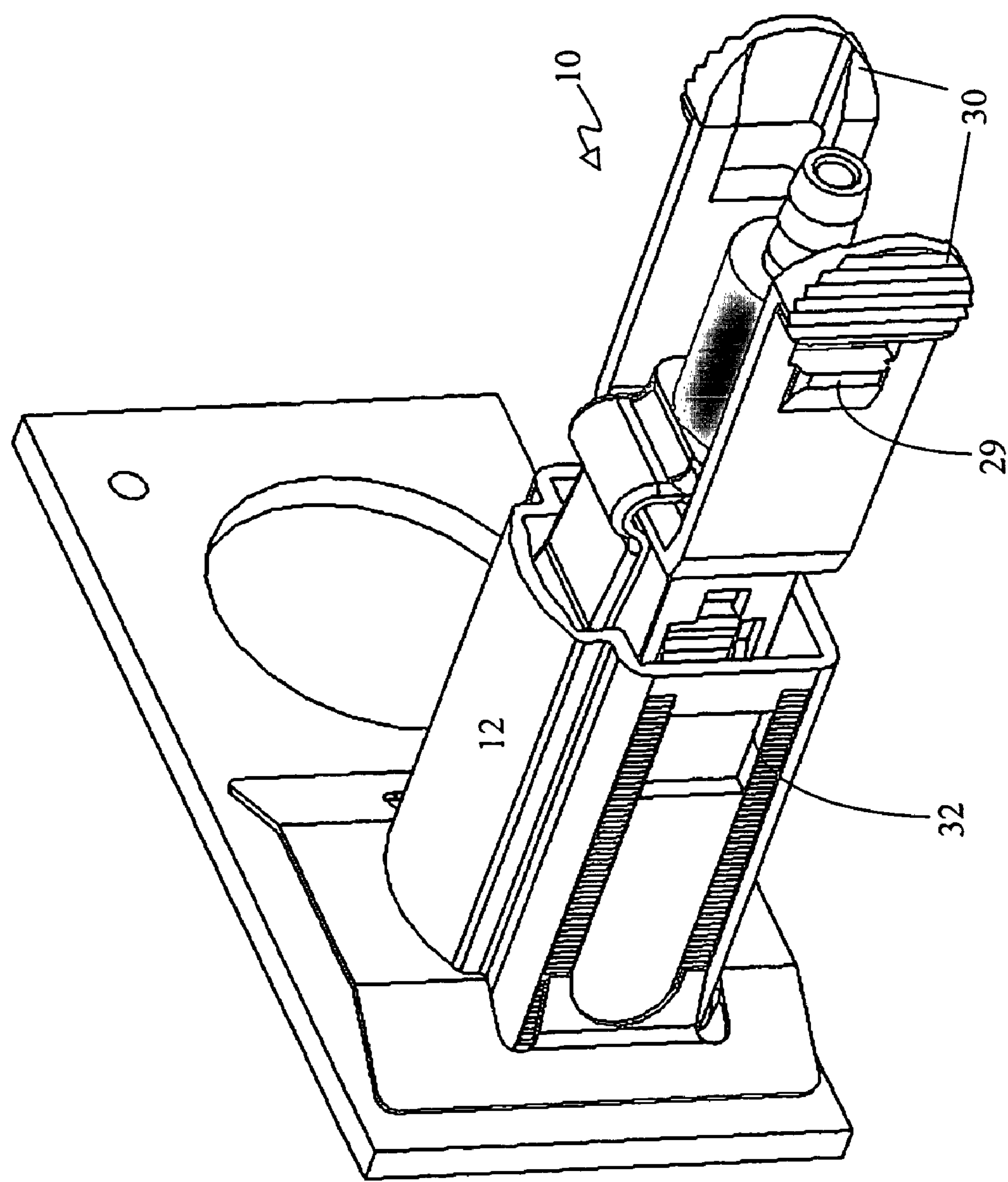
FIG. 3 is an isometric view of the rear of the connector system, showing separation of a connector assembly and a support assembly of the system.
Figure 4:
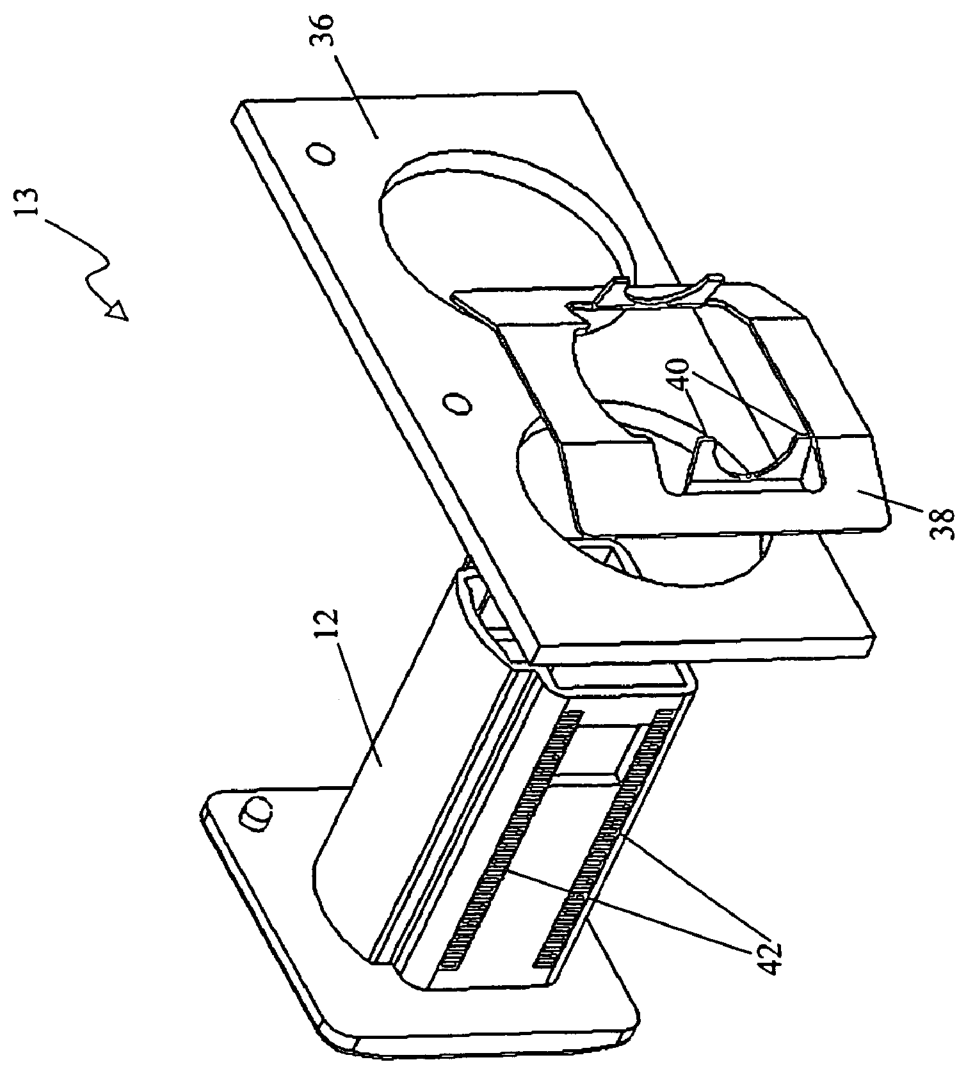
FIG. 4 is an isometric exploded view of the support assembly.
Figure 6:
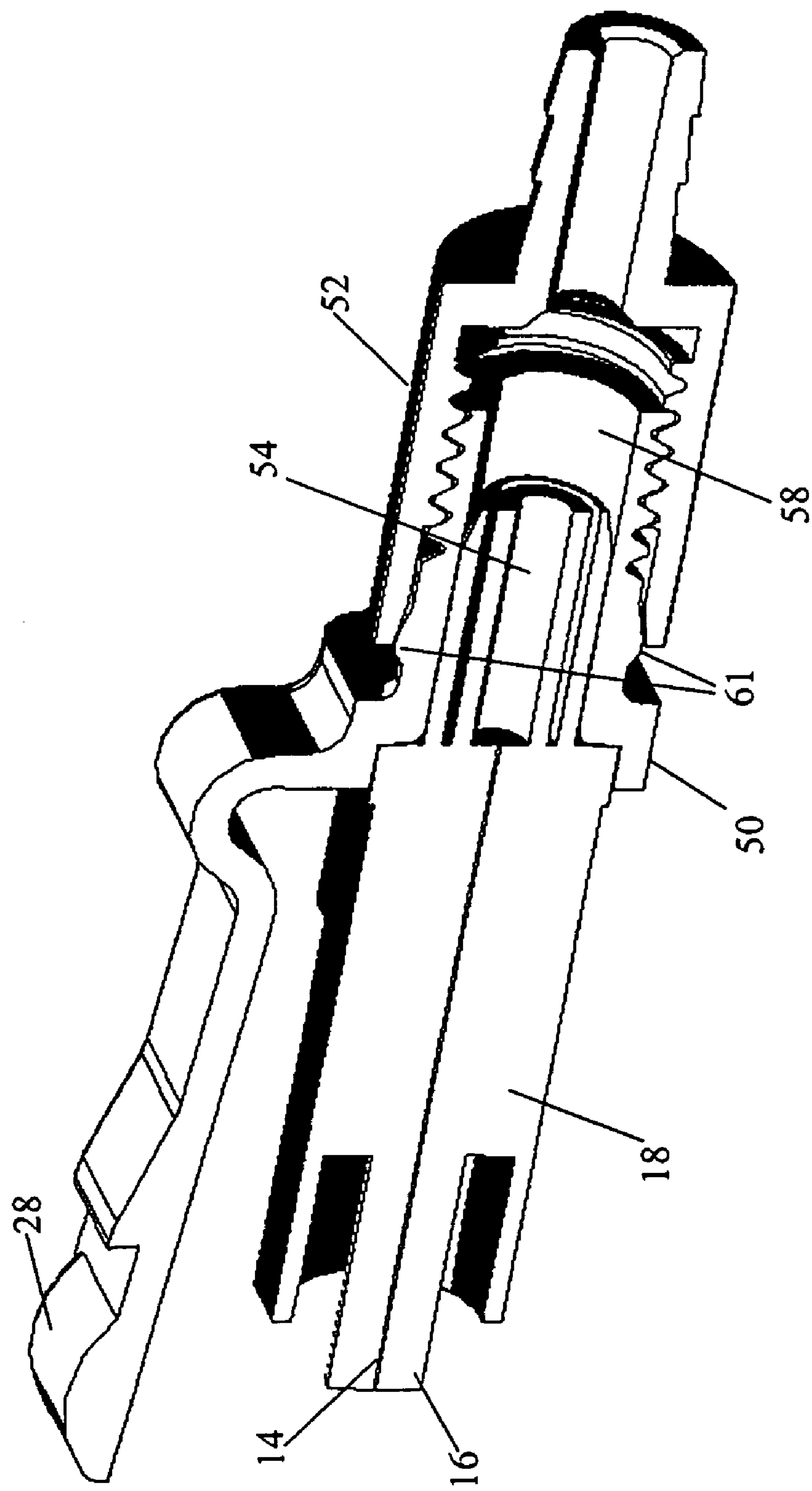
FIG. 6 is an isometric cross-section view of an inner sleeve assembly of the connector assembly.
Figure 7:
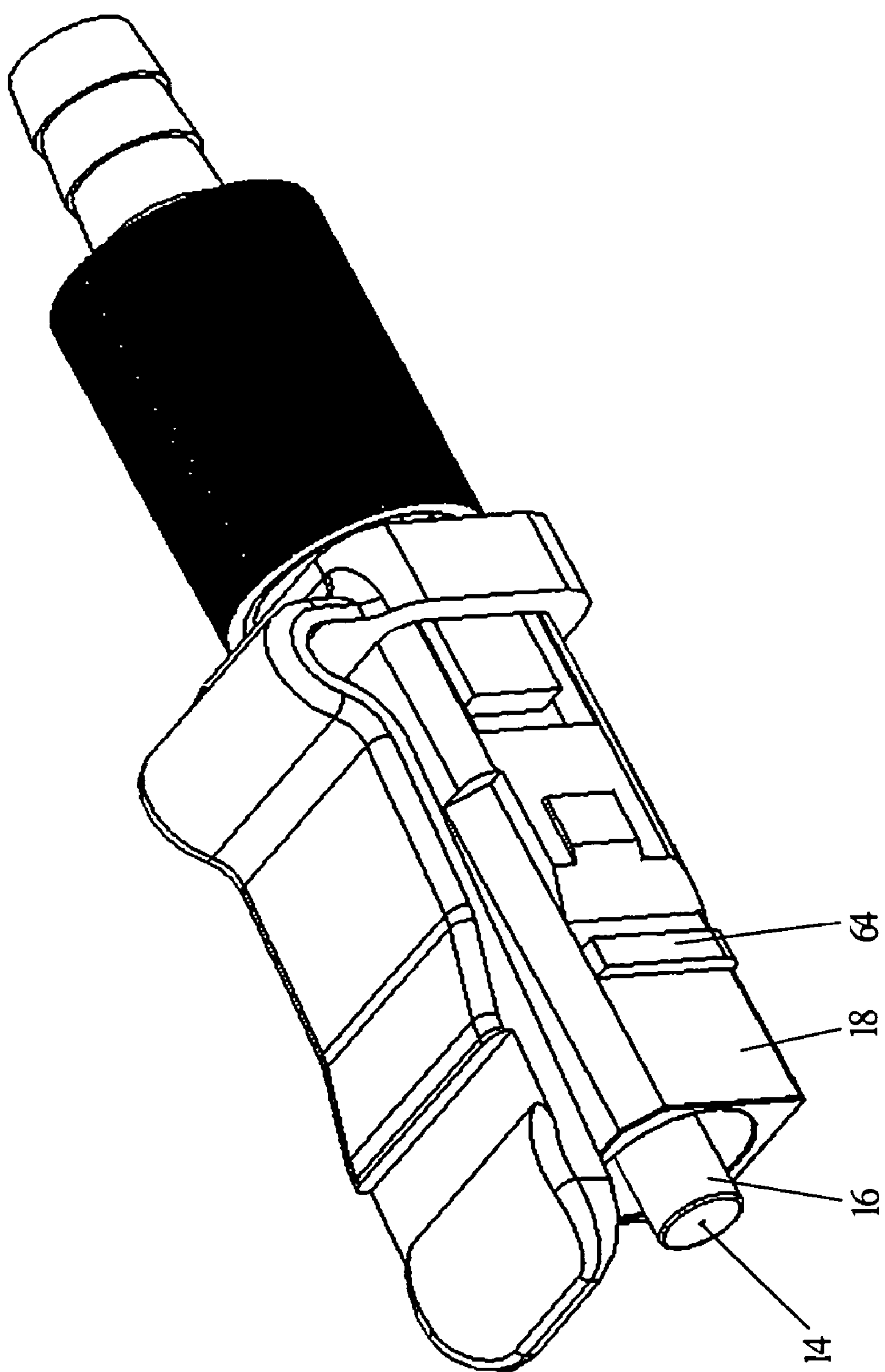
FIG. 7 is an isometric view of the inner sleeve assembly.

As shown in FIGS. 1 and 3, an optical fibre connector system includes an SC connector assembly 10 located within a receptacle or support 12. As shown in FIG. 4, the support 12 is part of a support assembly 13 that allows the connector system to be mounted on a faceplate or a wall, securing the connector system for use in optical instrumentation or interconnection facilities, as described in Australian Patent No. 726349. As shown in FIGS. 1, 6 and 7, the tip of an optical fibre 14 is fixed within the connector assembly 10 by a ferrule 16 that provides precise physical positioning of the fibre 14. The ferrule 16 is normally cylindrical with an outer diameter of 2.5 mm and an inner diameter that matches the outer diameter of the fibre 14, which is normally about 125 microns. As shown in FIG. 1, the ferrule 16 is supported by an inner sleeve 18 and an outer sleeve 20 of the SC connector assembly 10. The outer sleeve 20 is held within the support 12 so as to provide a recess 22 around the outer sleeve 20. The fibre cable that would normally be seen projecting from the rear of the connector assembly 10 has not been shown for clarity.

Figure 2:
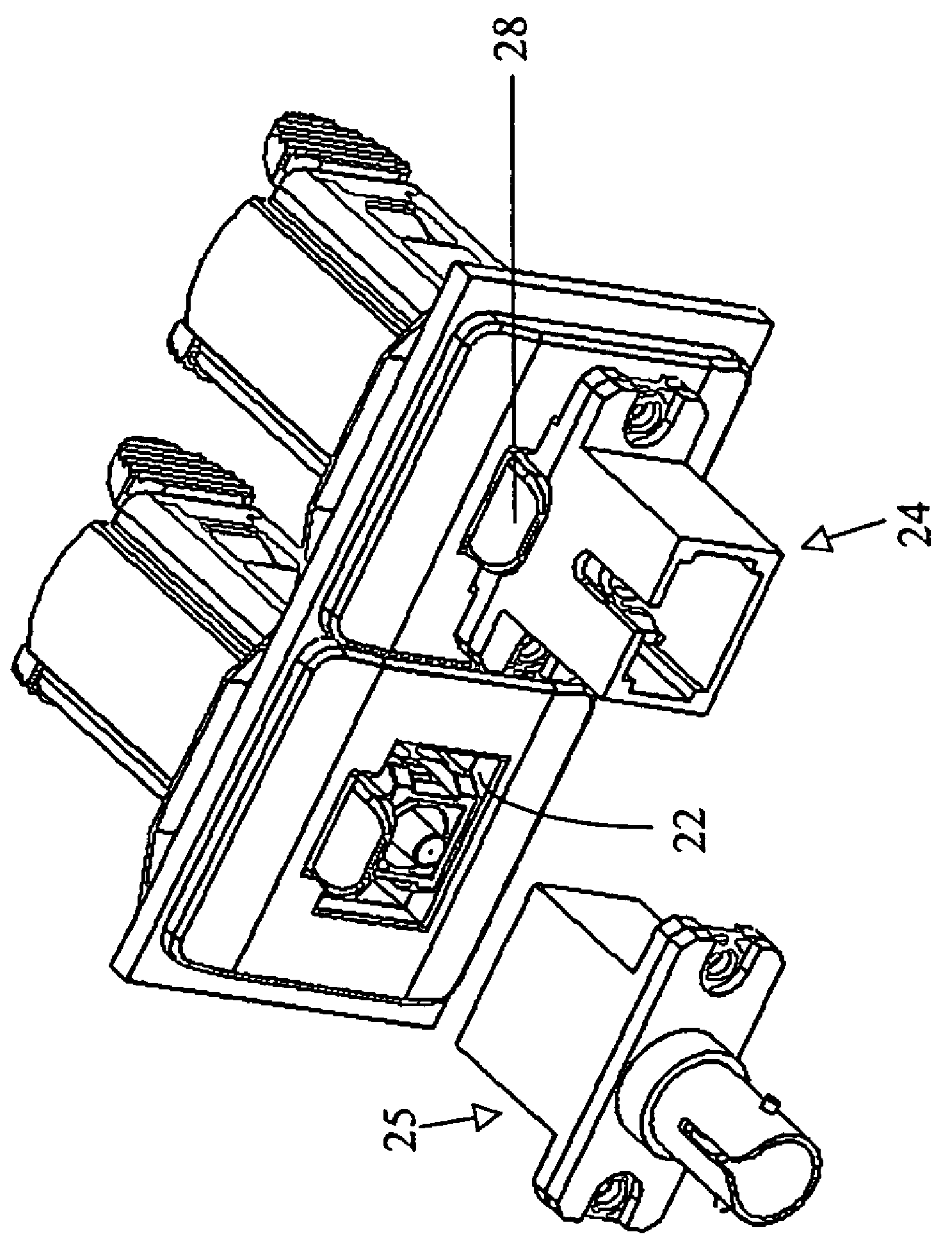
FIG. 2 is an isometric view of two of the connector systems and through connectors for connecting optical fibre cables to the systems.
Figure 9:
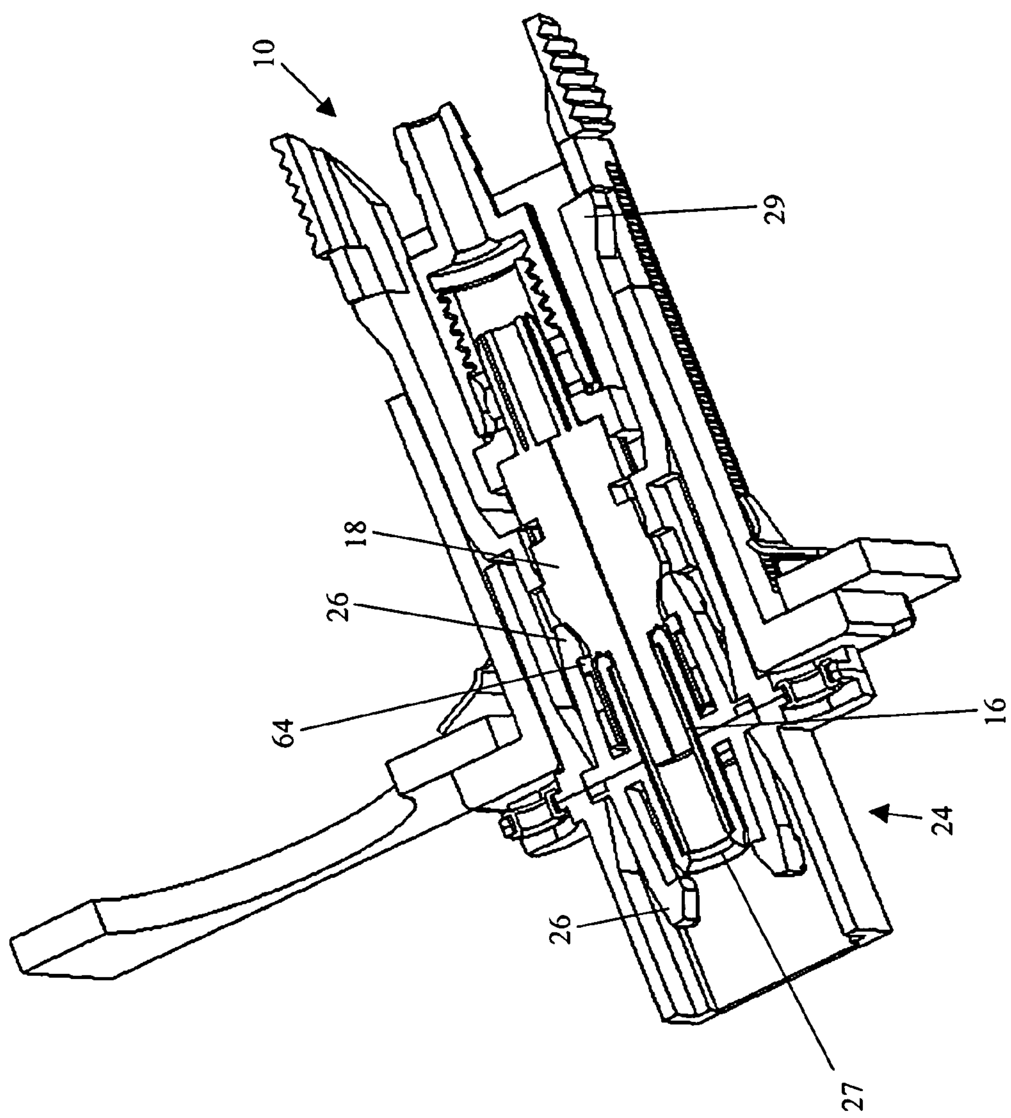
FIGS. 9 and 10 are isometric cross-section views of the connector system connected to a through connector.
Figure 10:
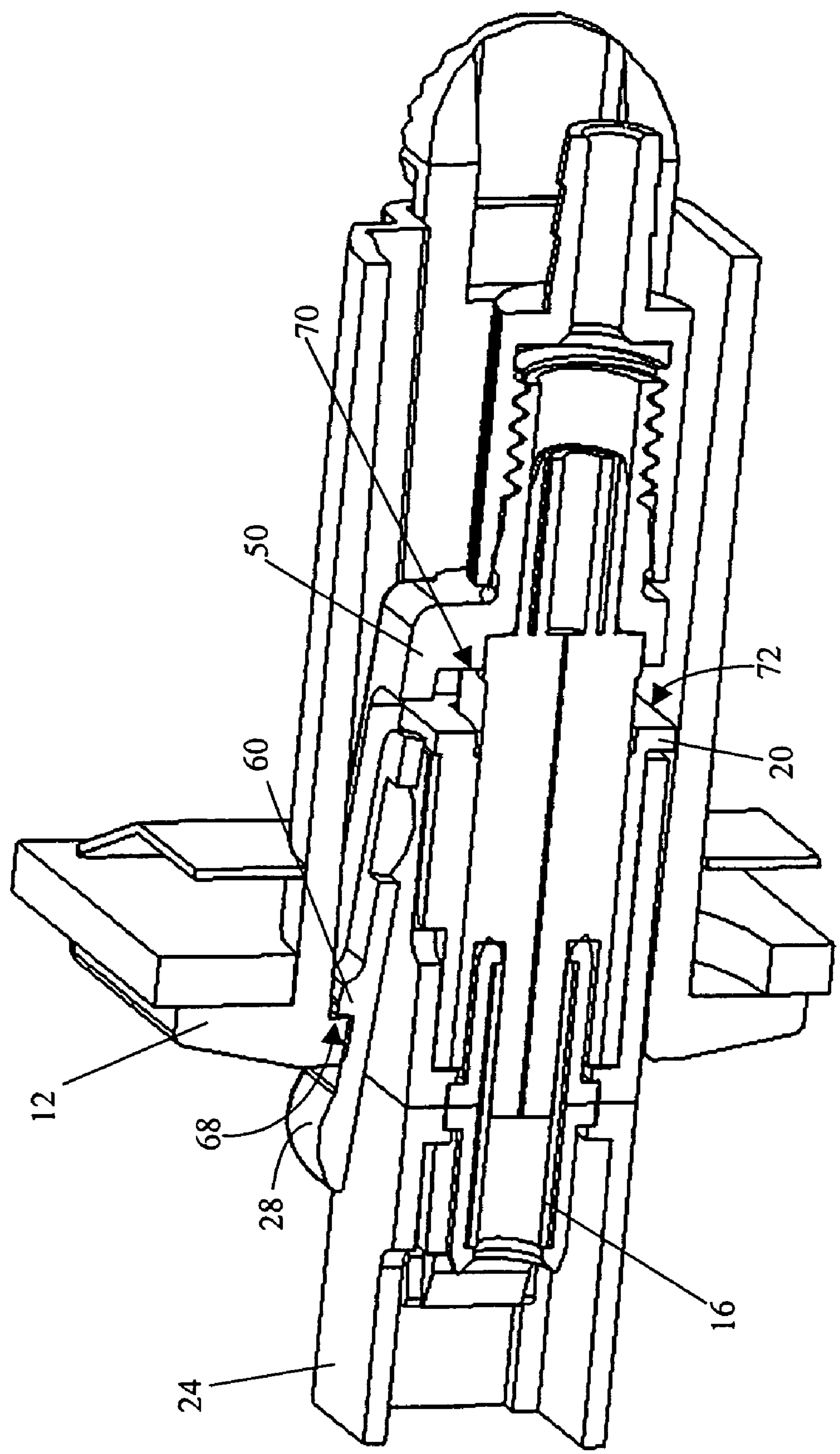

As shown in FIGS. 2, 9 and 10, the recess 22 allows a through connector 24 to be connected to the connector assembly 10 so as to engage with the ferrule 16 and the inner sleeve 18 to secure the through connector 24 to the connector system. As shown in FIG. 9, two locking arms 26 laterally disposed about an alignment sleeve 27 within the through connector 24 lock onto locking tabs 64 on the inner sleeve 18 as the through connector 24 is pushed into the recess 22. The through connector 24 cannot be removed from the connector system by pulling on the fibre cable or the through connector 24 without damaging the connectors 10, 24. The through connector 24 can only be safely removed from the connector system by depressing a release arm 28 and pulling the through connector 24 away from the connector system, as described below. The securing of the through connector 24 and the optical connector system prevents accidental disconnection when the cable or fibre is accidentally pulled. Similar features to prevent accidental disconnection are provided by a number of alternative connectors.

A through connector that is used to connect two optical connectors of different types is referred to as a through adaptor, an inter-series adaptor, or an inter-series through adaptor. For example, the through connector 25 illustrated in FIG. 2 is a through adaptor for interconnecting an ST optical connector and an SC optical connector.

As shown in FIG. 3, the connector assembly 10 is retained within the support 12 by connector assembly locking tabs 29 that engage with walls of openings 32 in the sides of the support 12. The connector assembly locking tabs 29 project from the outer surfaces of two resilient connector assembly release arms 30 of the connector assembly 10. The connector assembly 10 can be removed from the support 12 by squeezing the resilient connector assembly release arms 30 towards each other and withdrawing the connector assembly 10 from the rear opening of the support 12.

As shown in FIG. 4, the support 12 is part of a support assembly 13 that further includes a support face plate 36 arid a support locking plate 38. The support locking plate 38 is a resilient metal plate in the shape of a platform with oblique projecting arms 40 that engage with ridges 42 formed along the outer sides of the support 12 to secure the support 12 against the support face plate 36.

Figure 5:
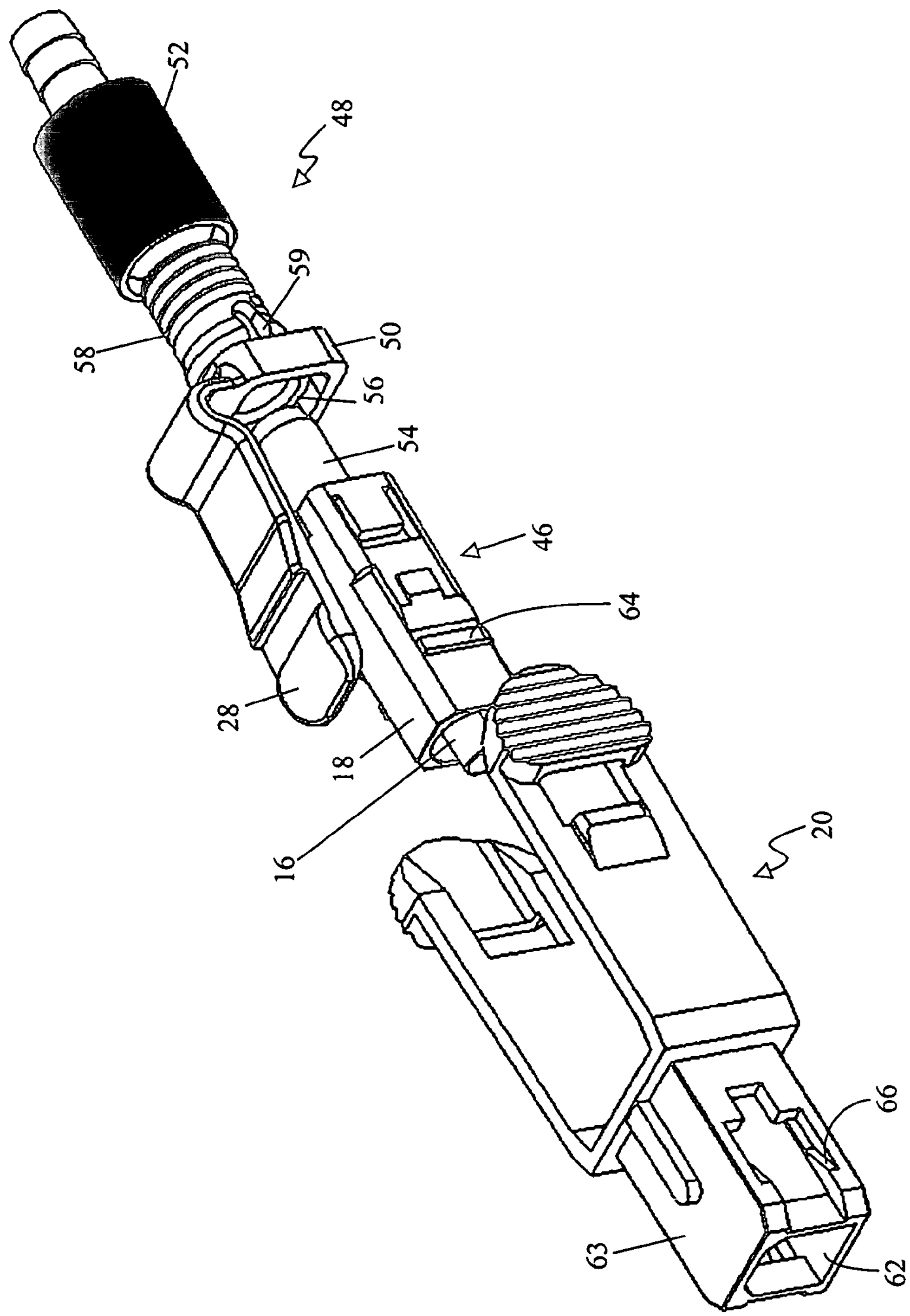
FIG. 5 is an isometric exploded view of the connector assembly.

As shown in FIG. 5, the connector assembly 10 includes the outer sleeve 20, and an inner sleeve assembly comprising an inner sleeve 46 and an inner sleeve locking assembly 48. The inner sleeve locking assembly 48 includes an inner sleeve locking support 50, and an inner sleeve locking nut 52. The inner sleeve locking support 50 includes an inner sleeve locating recess 56, a locking sleeve 58, and the release arm 28.

The inner sleeve 46 is a standard SC optical connector inner sleeve that supports the ferrule 16 and is connected to a boot 54 at the rear. The boot 54 slides through an opening and locating recess 56 in the inner sleeve locking support 50 to nest within the locking sleeve 58. The locking sleeve 58 has a threaded outer surface which mates with the inner thread of the inner sleeve locking nut 52. As shown in FIG. 6, a raised annular portion 61 around the outer surface of the locking sleeve 58 causes the end of the locking sleeve 58 nearest the boot 54 to be forced radially inwards to clamp the boot 54 as the inner sleeve locking nut 52 is screwed onto the locking sleeve 58. As shown in FIG. 5, two longitudinally disposed slit openings 59 in this end of the locking sleeve 58 facilitate this clamping action. Accordingly, the inner sleeve 46 and the inner sleeve locking assembly 48 are secured together to form an inner sleeve assembly, as shown in FIG. 7.

Figure 8:
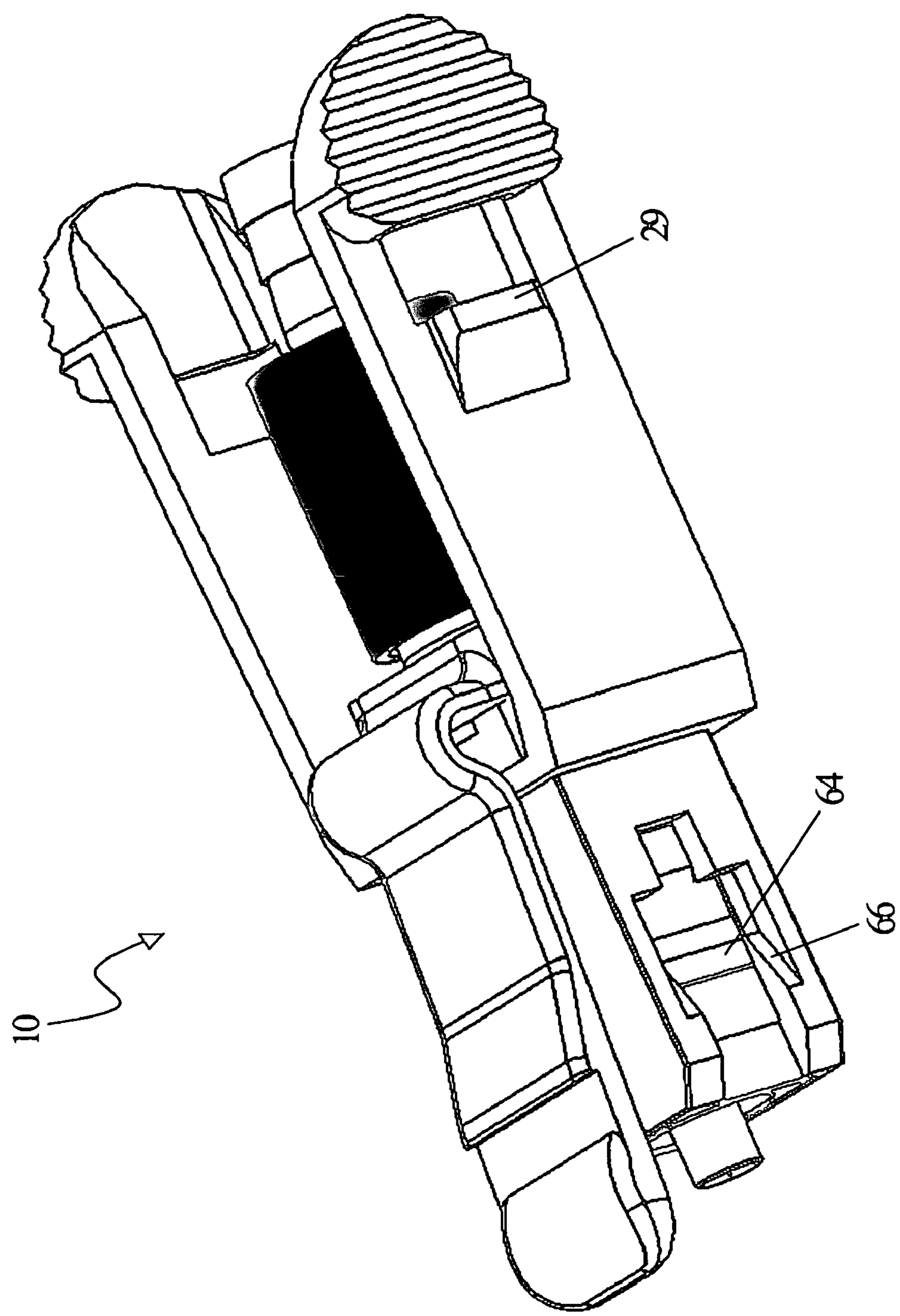
FIG. 8 is an isometric view of the connector assembly.

The connector assembly 10, as shown in FIG. 8, can then be formed by sliding the inner sleeve 46 of the inner sleeve assembly within an opening 62 in the outer sleeve 20. The front portion 63 of the outer sleeve 20 is the same shape as a standard SC outer sleeve and incorporates standard SC connector release features, as described below. This allows the connector assembly 10 to connect to the standard SC through connector 24, and for the through connector 24 to be subsequently released by sliding relative movement of the inner sleeve 46 and the outer sleeve 20.

As the through connector 24 is pushed onto the connector assembly 10, the resilient arms 26 within the through connector 24 are deformed around the inner sleeve locking tabs 64 as they slide over the tabs 64. Once past, the arms 26 snap back into position and lockingly engage with the tabs 64 to prevent accidental removal of the through connector 24. In order to release the through connector 24, the inner sleeve 46 is slid forward relative to the outer sleeve 20, so that the sloping tab release guides 66 in the outer sleeve 20 lift the through connector arms 26 away from the inner sleeve locking tabs 64 to release the through connector 24. This requires relative movement of the inner sleeve 46 and the outer sleeve 20. However, the outer sleeve 20 is held in place by the connector assembly locking tabs 29, and the inner sleeve 46, being secured within the inner sleeve locking assembly 48, is held in place by the engagement of a connector release locking tab 60 of the resilient connector assembly release arm 28 against a retaining edge 68 of the support 12, as shown in FIG. 10. Thus, the through connector 24 cannot be removed from the connector assembly 10 without damaging the connectors unless the resilient connector assembly release arm 28 is depressed to disengage the connector release locking tab 60 from the retaining edge 68. This releases the inner sleeve assembly and allows it to slide away from the outer sleeve 20 when the through connector 24 is pulled away from the connector assembly 10, thus disengaging the through connector arms 26, as described above. The sliding movement is stopped when a front wall 70 of the inner sleeve locking support 50 meets with the rear wall 72 of the outer sleeve 20. However, the degree of relative movement of the outer sleeve 20 and inner sleeve 46 thus achieved is sufficient to release the through connector 24, as described above, which can then be removed from the connector assembly.

Many modifications will be apparent to those skilled in the art without departing from the scope of the present invention as herein described with reference to the accompanying drawings. For example, although the preferred embodiment of the connector assembly has been described in terms of SC optical connector components, it will be apparent that alternative embodiments could be based on alternative connector types, such as LC or MU connectors.

The invention claimed is:

1. An optical fibre connector system, including an optical connector disposed therein, a support supporting said optical connector, said support having a recess allowing a through connector to be connected to said optical connector, and an engagement mechanism which is separate to and acts on said optical connector to prevent release of said through connector when connected to said optical connector, and which is operable to enable release of said through connector; and wherein said optical connector includes at least two components that are engaged to prevent said release of said through connector, said release being enabled by disengaging only one of said components.

2. An optical fibre connector system as claimed in claim 1, wherein said engagement mechanism includes a movable element which normally engages said optical connector to said support and which is operable to disengage said optical connector from said support to enable said release of said through connector.

3. An optical fibre connector system as claimed in claim 2, wherein said movable element is normally biased.

4. An optical fibre connector system as claimed in claim 2, wherein said element is a resilient arm which is attached to part of said optical connector.

5. The connector system of claim 4, wherein a portion of said arm passes through said support, said portion being movable relative to said support to disengage said arm from said support and thereby enable said release of said through connector from said optical connector.

6. An optical fibre connector system as claimed in claim 1, wherein said components are relatively movable along a longitudinal axis of said connector to enable said release.

7. An optical fibre connector system as claimed in claim 1, wherein said components are normally engaged with said support to prevent said release, and said release is enabled by disengaging only one of said components from said support.

8. An optical fibre connector system as claimed in claim 1, wherein the at least two components comprise an inner sleeve and an outer sleeve, and wherein said optical connector is part of a connector assembly of said optical fibre connector system, said connector assembly including the inner sleeve for supporting an optical fibre and for reversibly engaging said support to enable said release of said through connector, and the outer sleeve for supporting said inner sleeve and for reversibly engaging said optical connector to said support.

9. An optical fibre connector system as claimed in claim 1, wherein said optical connector includes an SC, LC, or MU connector.

10. The connector system of claim 1, wherein the recess receives at least a portion of the through connector.

11. An optical fibre connector assembly, including:

an optical connector disposed therein;

an engagement mechanism that acts on said optical connector to prevent release of a through connector when connected to said optical connector and enables release of said through connector, without acting upon said through connector; and wherein said optical connector includes components that are engaged to prevent said release of said through connector, said release being enabled by disengaging only one of said components.

12. An optical fibre connector assembly as claimed in claim 11, wherein said components are relatively movable along a longitudinal axis of said connector to enable said release.

13. An optical fibre connector assembly as claimed in claim 11, including a second engagement mechanism that is operable to enable release of said optical connector.

14. The connector assembly of claim 11, comprising two separate optical fibers, and wherein the through connector comprises an opening to receive the two separate optical fibers.

15. An optical fibre connector assembly as claimed in claim 11, wherein said optical connector includes an SC, LC, or MU connector.

16. An optical fibre connector assembly, including an optical connector having components that are relatively movable along a longitudinal axis of said connector to enable release of a through connector when connected to said optical connector, wherein said components are normally engaged to prevent release of said through connector, said assembly further including an engagement mechanism that is operable to disengage only one of said components to enable release of said through connector.

17. An optical fibre connector assembly as claimed in claim 16, including a second engagement mechanism that is operable to enable release of said optical connector.

18. An optical fibre connector assembly as claimed in claim 17, wherein said second engagement mechanism normally acts on a second component of said optical connector to prevent said release of said optical connector.

19. An optical fibre connector assembly as claimed in claim 16, wherein said optical connector includes an SC, LC, or MU connector.

20. An optical fibre connector system, including an optical connector disposed therein, a recess allowing a through connector to be connected to said optical connector, and an engagement mechanism which is separate to and acts on said optical connector to prevent release of said through connector when connected to said optical connector, and which is operable to enable release of said through connector;

a support and a connector assembly having means for reversibly engaging said support; and wherein said connector assembly includes an inner sleeve assembly for supporting an optical fibre and for reversibly engaging said support to enable said release of said through connector, and an outer sleeve for supporting said inner sleeve and for reversibly engaging said support.

21. An optical fibre connector system, including an optical connector disposed therein, a support supporting said optical connector, said support having a recess allowing a through connector to be connected to said optical connector, and an engagement mechanism which is separate to and acts on said optical connector to prevent release of said through connector when connected to said optical connector, and which is operable to enable release of said through connector; and wherein said optical connector is part of a connector assembly of said optical fibre connector system, said connector assembly including an inner sleeve assembly for supporting an optical fibre and for reversibly engaging said support to enable said release of said through connector, and an outer sleeve for supporting said inner sleeve and for reversibly engaging said optical connector to said support.

* * * * *